(12) United States Patent
Müller et al.

(10) Patent No.: US 7,699,032 B2
(45) Date of Patent: Apr. 20, 2010

(54) CAMSHAFT OF AUTOMOTIVE COMBUSTION ENGINES IN PARTICULAR

(75) Inventors: Harald Rüdiger Müller, Ostfildern (DE); Jürgen Rommel, Burgstetten (DE); Falk Schneider, Korntal-Münchingen (DE)

(73) Assignee: MAHLE International GmbH, Stuttgart (DE)

( * ) Notice: Subject to any disclaimer, the term of this patent is extended or adjusted under 35 U.S.C. 154(b) by 393 days.

(21) Appl. No.: 11/724,421

(22) Filed: Mar. 15, 2007

(65) Prior Publication Data
US 2007/0224861 A1 Sep. 27, 2007

(30) Foreign Application Priority Data
Mar. 23, 2006 (DE) .................. 10 2006 013 813

(51) Int. Cl.
*F01L 1/04* (2006.01)
(52) U.S. Cl. ............... 123/90.6; 123/90.27; 123/90.16; 29/888.1
(58) Field of Classification Search ............... 123/90.6, 123/90.27, 90.16; 29/888.1; 74/567
See application file for complete search history.

(56) References Cited

U.S. PATENT DOCUMENTS

| | | | |
|---|---|---|---|
| 3,516,394 A | 7/1968 | Nichols | |
| 4,072,448 A | 2/1978 | Loyd, Jr. | |
| 4,332,222 A | 6/1982 | Papez | |
| 5,299,881 A | 4/1994 | Mettler-Friedli | |
| 5,431,131 A | 7/1995 | Kuhn et al. | |
| 5,645,022 A | 7/1997 | Yamamoto et al. | |
| 5,724,860 A | 3/1998 | Sekiguchi et al. | |
| 5,729,899 A | * 3/1998 | Kaywood et al. | .......... 29/888.1 |
| 6,718,924 B1 | 4/2004 | Isaacs et al. | |

FOREIGN PATENT DOCUMENTS

| | | |
|---|---|---|
| DE | 28 22 147 C3 | 11/1979 |
| DE | 39 43 426 C1 | 4/1991 |
| DE | 41 37 978 C1 | 4/1993 |
| DE | 43 24 836 A1 | 1/1995 |
| DE | WO 98/26161 | 6/1998 |
| DE | 197 57 504 A1 | 7/1999 |
| DE | 299 22 876 U1 | 6/2000 |
| EP | 13 62 986 A1 | 11/2003 |
| GB | 1131379 A | 11/1967 |

\* cited by examiner

*Primary Examiner*—Zelalem Eshete
(74) *Attorney, Agent, or Firm*—Collard & Roe, P.C.

(57) ABSTRACT

With a camshaft for an automotive internal combustion engine in particular, having
two concentrically arranged shafts mounted to rotate in opposite directions, namely an inside shaft (3) and an outside shaft (4),
at least one single cam (1) fixedly connected to the inside shaft (3) by a pin (5) passing radially through the outside shaft (4) and passing radially through the outside shaft (4),
a bearing of the pin (5) in the respective pin receptacles (6), each running radially, in the cam and the inside shaft (3),
a lateral projection as the receptacle (6) on the cams (1),
a space-saving design of the at least one adjustable single cam should be achieved.

Figure 1:
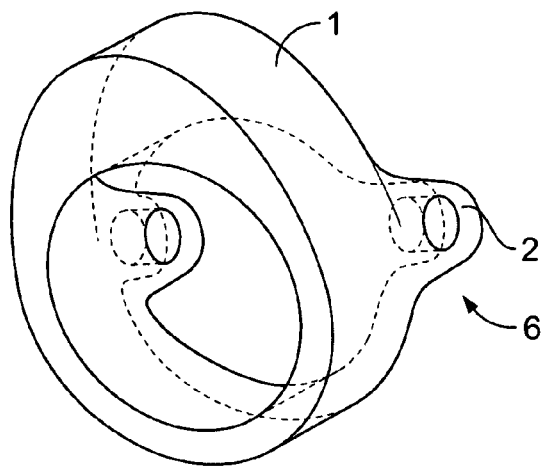

To this end, various space-saving pin receptacle designs are proposed. A space-saving measure is also provided with respect to an arrangement of an adjustable cam in close proximity to a cam fixedly connected to the outside shaft by adjustment of the shaft of the neighboring cam to the pin receptacle of the adjustable single cam.

8 Claims, 4 Drawing Sheets

CAMSHAFT OF AUTOMOTIVE COMBUSTION ENGINES IN PARTICULAR

CROSS REFERENCE TO RELATED APPLICATIONS

Applicant claims priority under 35 U.S.C. §119 of German Application No. 10 2006 013 813.9 filed Mar. 23, 2006.

The invention relates to a camshaft of automotive combustion engines, comprising in particular
- two shafts mounted concentrically one inside the other so they can rotate in opposite directions, namely an inside shaft and an outside shaft,
- at least one single cam mounted on the outside shaft so it can rotate and fixedly connected to the inside shaft by a pin radially through the outside shaft,
- a bearing of the pin in respective pin receptacles on the single cam, each running radially, and on the inside shaft and in particular
- a lateral projection on the single cam acting as a pin receptacle.

Such a camshaft is known from DE 39 43 426 C1. In the design there, the lateral projection functioning as a pin receptacle on the single cam is designed as a peripheral ring collar.

According to a first aspect of the present invention, it is concerned with the problem of designing a single cam according to the generic camshaft so that it has a lower weight.

This problem is solved by a camshaft having all the features of Patent Claim 1.

The second aspect of the present invention relates to the problem of being able to mount a single cam with a lateral projection for a pin receptacle in close proximity to a cam fixedly mounted on the outside shaft in a generic camshaft.

This problem is solved by a design of the camshaft according to primarily Claim 2 and in particular by a special embodiment according to Claim 3.

An embodiment according to Claim 4 shows an alternative approach to the problem mentioned last.

Other advantageous alternative approaches are the subject of additional claims.

Figure 2:
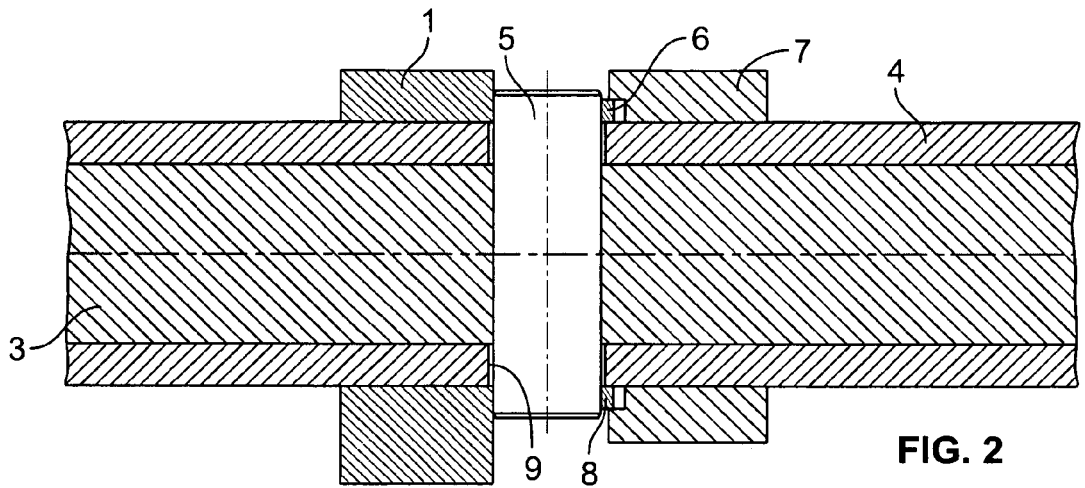
Figure 3:
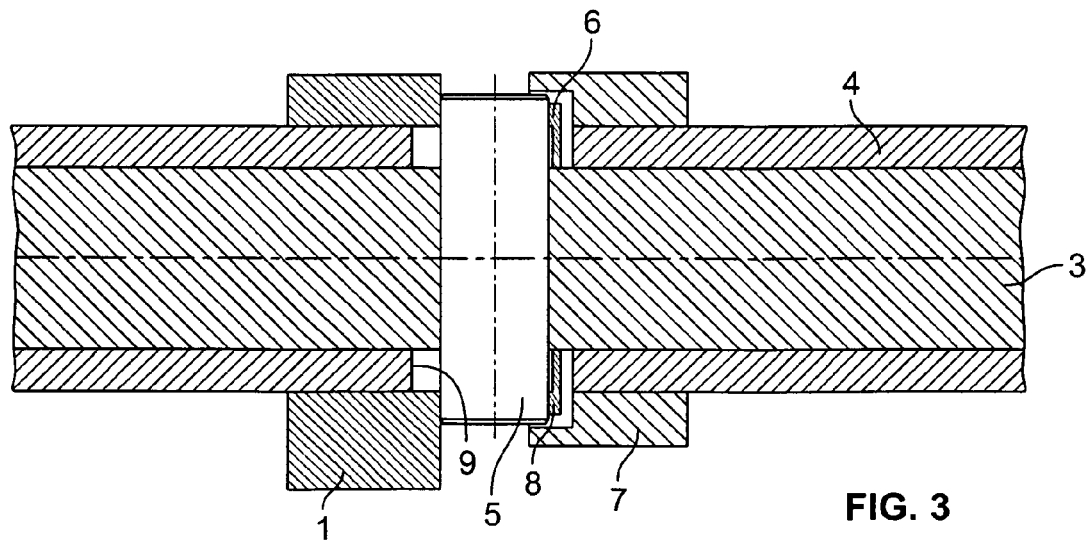
Figure 4A:
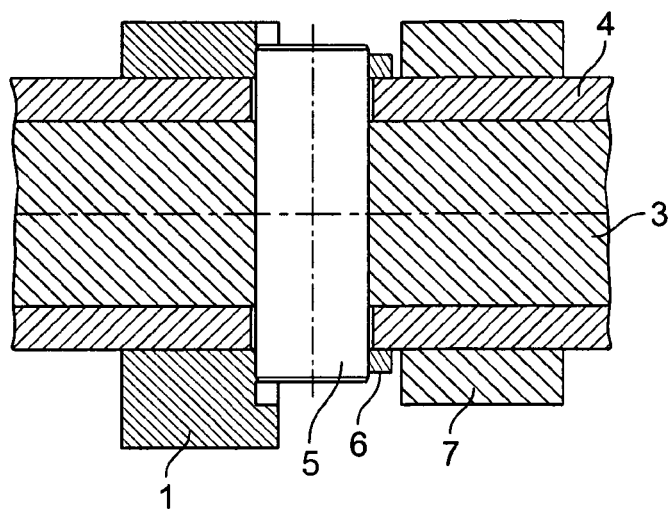
Figure 4B:
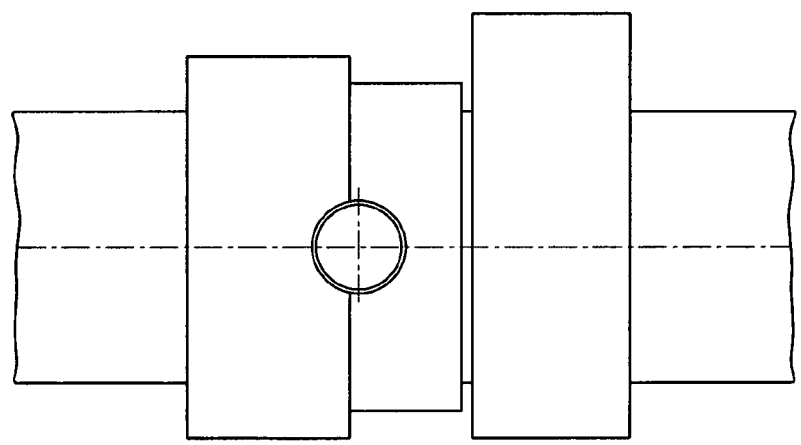
Figure 5:
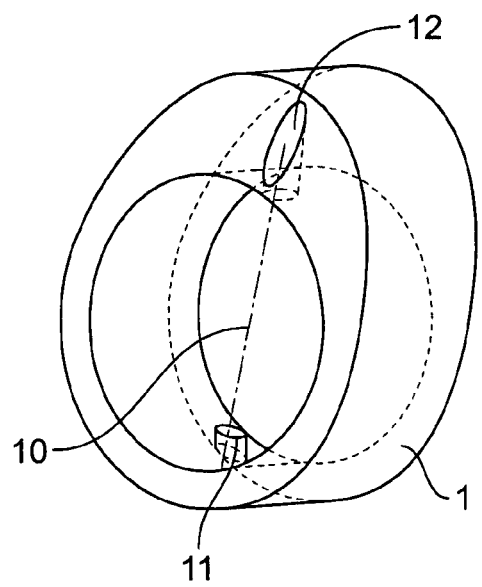
Figure 6:
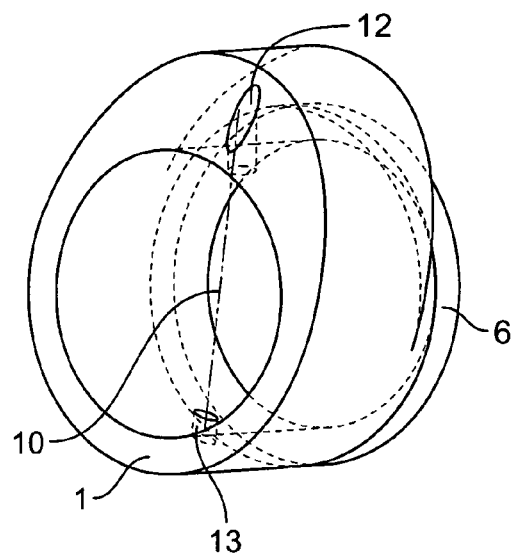
Figure 7:
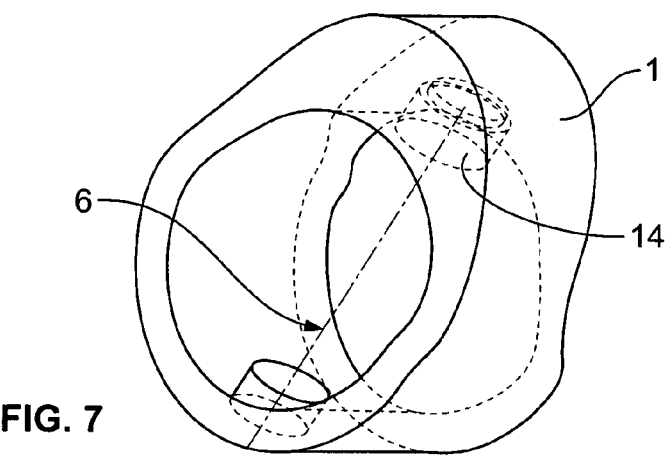
Figure 8:
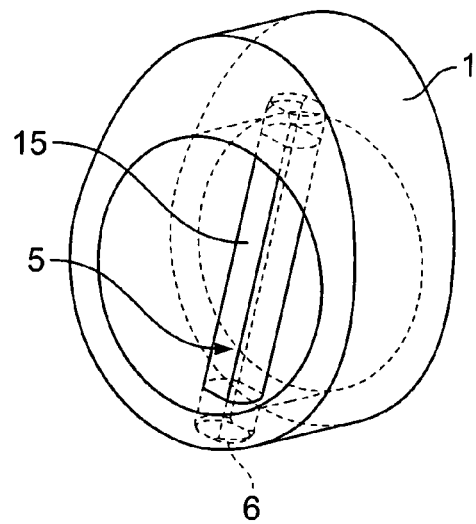
Figure 9:
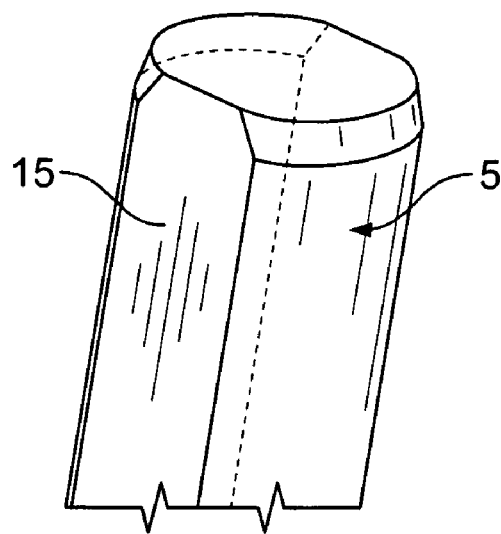
Figure 10:
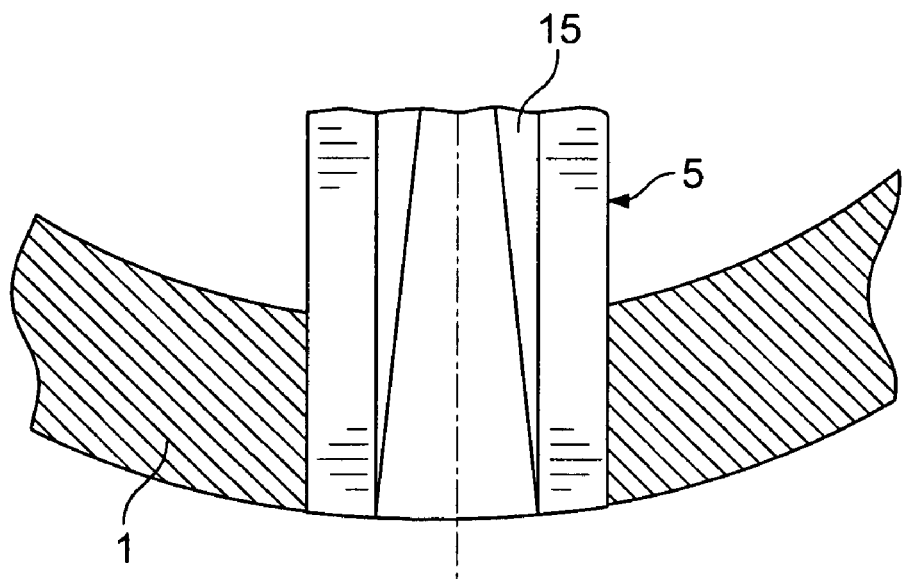

Exemplary embodiments of the various inventive approaches on the basis of which these approaches are explained below in greater detail are depicted in the drawings, which show:

FIG. 1 a perspective view of a single cam having a lateral pin receptacle projection bordered peripherally, FIG. 2 a longitudinal section through an axial partial area of a camshaft with a single cam whose lateral pin receptacle projection engages in a recess in a neighboring cam fixedly connected to the outside shaft, FIG. 3 a design similar to that shown in FIG. 2, in which the lateral projection engages jointly with a partial area of the pin in a recess of a neighboring cam, FIG. 4A a longitudinal section through an axial partial area of a camshaft with a single cam in which the pin is situated with only a partial cross section inside a pin receptacle in a projection provided laterally on the cam, FIG. 4B a side view of FIG. 4A, FIG. 5 a perspective view of a single cam in which the pin receptacle inside the cam is provided with a receptacle axis running obliquely, FIG. 6 a single cam embodiment comparable to the embodiment shown in FIG. 5, in which a lateral projection is provided and the oblique axis of the pin receptacle also includes this projection, FIG. 7 a perspective diagram of a single cam in which the pin receptacle is situated centrally inside this cam and the cam is wider on both sides in the area of the circle than in its cam elevation area, FIG. 8 a perspective diagram of a single cam with a central pin receptacle, FIG. 9 an enlarged diagram of the end of the fastening pin situated in the cam elevation area inside the cam according to FIG. 8, FIG. 10 a detail of the base circle area of the cam according to FIG. 8.

FIG. 1

FIG. 1 shows a perspective diagram of a single cam 1 of an adjustable camshaft, shown only in FIG. 2, with an outside shaft 4 and an inside shaft 3, the inside shaft 3 being supported inside the outside shaft 4. The single cam 1 shown here is rotatably mounted on the outside shaft 1. In the area of this single cam 1, the outside shaft has diametrically opposite radial recesses 9 in order to be able to connect the single cam 1 fixedly to the inside shaft 3 by means of a pin 5 extending through these radial recesses 9 in the outside shaft 4. The single cam 1 is provided with two diametrically opposite pin receptacles 6 in the form of a bearing eye 2 provided on each side as the receptacle for this fastening pin 5. These two bearing eyes 2 cover only a small partial circumferential area of the cam 1.

FIG. 2

FIG. 2 shows a longitudinal section through a partial area of an adjustable camshaft. In this partial area there is a single cam 1 fixedly connected to an inside shaft 3 of this camshaft. This single cam 1 is rotatably mounted on an outside shaft 4 of the adjustable camshaft, said outside shaft concentrically surrounding the inside shaft 3. The cam 1 is connected to the inside shaft 3 via a pin 5. This pin 5 engages in pin receptacles 6 in the cam 1, designed as lateral protrusions on the cam 1. Engagement here means that the pin 5 is inserted into bores provided in the pin receptacles 6. A connection of the pin 5 to the inside shaft 3 is provided by the fact that the pin 5 is mounted in a diametric through-hole in the inside shaft 3, whereby a shrink-fit bearing may be provided.

Another cam 7 is fixedly connected to the outside shaft 4 in proximity to the single cam 1. This additional cam 7 has a recess 8 in the form of a ring groove on the inside radially on its side wall facing the single cam 1. The pin receptacle 6 of the single cam 1 engages in this recess 8 with a partial area. This partial area is outside of the bore of the pin receptacle 6 in which the respective pin 5 is mounted.

The single cam 1 shown in FIG. 2 may have a lateral projection as the pin receptacle 6, designed as a peripheral ring collar. The pin receptacle 6 of this single cam 1 may also be designed in the form of the pin receptacle shown in FIG. 1, i.e., it may consist only of bearing eyes 2. The same thing is also true of the camshaft embodiment described below according to FIG. 3.

FIG. 3

The embodiment according to FIG. 3 differs from that according to FIG. 2 in that the lateral pin receptacle 6 of the single cam 1 engages in the recess 8 of the neighboring cam 7 to a greater extent. To a greater extent here means that a cross-sectional partial area of the pin 5 also comes to lie within the recess 8 when the camshaft is completely installed.

To permit assembly of the pin in this embodiment, the outside shaft 4 must have radial recesses 9 for inserting the pin 5, these radial recesses having an elongated hole shape in the longitudinal direction of the camshaft. Due to this design of the radial recesses 9, it is possible to perform the pinning of the single cam 1 to the inside shaft 3 in a condition in which the inside shaft 3 assumes an axially displaced position with respect to the outside shaft 4 in the finished assembled stated.

FIGS. 4A and 4B

In the embodiment according to FIGS. 4A and 4B, the single cam 1 in turn has a lateral projection as the pin receptacle 6. In contrast with the arrangement of the pin 5 in the pin receptacle 6 in the embodiment in FIG. 2, the receptacle bore for the pin 4 is not located exclusively in the lateral pin receptacle projection 6 but instead engages in the cam 1, i.e., engaging partially in its main body. The receptacle bore ends in a blind hole in the elevation area of the cam inasmuch as it is situated inside the main body of the cam 1. The receptacle bore, however, tapers off radially in the basic circular area of the cam 1 to be able to insert the pin 5 from this side.

FIG. 5

In this embodiment of the single cam 1, the receptacle for the pin 5 runs inside a single cam 1 without a lateral pin receptacle projection. The pin receptacle here has a receptacle axis 10 running obliquely through the cam 1. The receptacle axis 10 here runs in such a way that it opens radially inside the base circle area of the cam 1 in a blind hole 11 provided there. This blind hole 11 is closed on the outside radially in the base circle area and is open toward the receptacle bore of the cam 1. Diametrically opposite the blind hole 11, the receptacle axis 10 tapers out laterally in a discharge groove 12 in the elevation area of the cam 1 at the side of the cam.

FIG. 6

The embodiment according to FIG. 6 differs from that according to FIG. 5 only in that it has a lateral pin receptacle 6 in the form of a projection and the receptacle axis 10 in the base circle area of the cam tapers out openly toward the outside radially via a borehole 13 provided there through the pin receptacle projection 6.

FIG. 7

In the embodiment of the cam according to FIG. 7, the half of the cam 1 having the base circle has a greater axial width than the width of the cam 1 in its elevation area. In this embodiment, a central pin receptacle 6 with a blind hole 14 is provided, ending with a closed end in the cam elevation area while it tapers out openly in the area of the base circle.

FIG. 8

In the embodiment of the single cam according to FIG. 8, again a central pin receptacle 6 is provided, ending as a blind hole inside the elevation area of the cam. The particular feature of this embodiment consists of a surface-locking closure of the pin 5 within the base circle area of the cam 1. This surface-locking closure is achieved by the fact that the end face of the pin 5 that comes to lie there has a curvature that matches the adjacent base circle area. To be able to install a pin 5 designed in this way so that there is surface locking accordingly, it is necessary to insert the pin 5 so that it is positioned accurately, i.e., it must be inserted in a precisely predetermined rotational position with respect to the axis of the pin 5. Such defined positioning is achieved by guidance means coordinated in a complementary manner on the pin 5 on the one hand and on the receptacle bore for this pin 5 on the cam 1 on the other hand. To this end, a flattened area 15 may be provided in at least one area on its circumference as the guidance means, corresponding to a complementary contact surface inside the borehole.

All the features described in the description and in the following claims may be essential to the present invention either individually or when combined in any form.

The invention claimed is:

1. A camshaft of automotive internal combustion engines in particular, comprising two concentrically arranged mutually rotatable shafts, namely an inside shaft (3) and an outside shaft (4), at least one single cam (1) that is rotatably mounted on the outside shaft (4) and fixedly connected to the inside shaft (3) via a pin (5) through the outside shaft (4), a bearing of a pin (5) in the respective pin receptacles (6) in the cam and the inside shaft (3), each running radially, a lateral projection as a pin receptacle (6) on the cam (1), wherein the lateral projections are designed as bearing eyes (2) that cover only a short circumferential area of the single cam (1).

2. The camshaft according to claim 1, wherein a cam (7) that is in close proximity to the single cam (1) and is fixedly joined to the outside shaft (4) has a recess (8) suitable for at least partially accommodating the projection of the single cam (1) that is designed as a pin receptacle (6).

3. The camshaft according to claim 2, wherein the radial recesses (9) inside the outside shaft (4) through which the pin (5) passes are designed for axial displacement between the inside shaft (3) and the outside shaft (4), so that when a pin (5) has already been inserted, a partial area of this pin (5) together with an area of the projection of the cam (1) designed as a pin receptacle (6) can be situated in the recess (8) for accommodating the pin receptacle (6) of the neighboring cam (7) that is fixedly connected to the outside shaft.

4. The camshaft according to claim 1, wherein the pin receptacles (6) of the single cam (1) run only partially through lateral projections—not forming any bearing surface on the cam (1)—with respect to the axial width of the cam.

5. A camshaft of an automotive internal combustion engine, having two concentrically arranged shafts mounted to rotate in opposite directions, namely an inside shaft (3) and an outside shaft (4), at least one single cam (1) fixedly connected to the inside shaft (3) by a pin (5) passing radially through the outside shaft (4) and passing radially through the outside shaft (4), a bearing of the pin (5) in the respective pin receptacles (6), each running radially, in the cam and the inside shaft (3), wherein the axis (10) of the pin receptacles (6) runs obliquely to a rotational axis of the single cam (1) inside the single cam (1) with a blind hole bore (11) in the base circle area of the cam (1) and an outlet through a discharge groove (12) in the axial side area of the cam elevation of the cam (1).

6. A camshaft of an automotive internal combustion engine, having
- two concentrically arranged shafts mounted to rotate in opposite directions, namely an inside shaft and an outside shaft,
- at least one single cam fixedly connected to the inside shaft by a pin passing radially through the outside shaft and passing radially through the outside shaft,
- a bearing of the pin in the respective pin receptacles, each running radially, in the cam and the inside shaft,
- wherein the axis of the pin receptacles runs obliquely inside the single cam with a blind hole bore in the base circle area of the cam and an outlet through a discharge groove in the axial side area of the cam elevation of the cam, wherein the camshaft has
- a lateral projection as the pin receptacle (6) on the cam (1), and
- wherein the axis (10) of the pin receptacles (6) runs obliquely inside the single cam (1) from an area of the lateral pin receptacle projection to a side of the single cam (1) opposite the projection in a side area of the single cam (1) near the cam elevation.

7. A camshaft of an automotive internal combustion engine, having
- two concentrically arranged shafts mounted to rotate in opposite directions, namely an inside shaft and an outside shaft,
- at least one single cam fixedly connected to the inside shaft by a pin passing radially through the outside shaft and passing radially through the outside shaft,
- a bearing of the pin in the respective pin receptacles, each running radially, in the cam and the inside shaft,
- wherein the axis of the pin receptacles runs obliquely inside the single cam with a blind hole bore in the base circle area of the cam and an outlet through a discharge groove in the axial side area of the cam elevation of the cam, and wherein
- the pin receptacles (6) of the single cam (1) run with their axes inside the axial middle plane of the single cam (1),
- the pin receptacle situated inside the cam elevation is designed as a blind hole bore (14),
- the single cam is designed to be wider axially in an area adjacent to its base circle than in the area of its cam elevation.

8. A camshaft of an automotive internal combustion engine, having
- two concentrically arranged shafts mounted to rotate in opposite directions, namely an inside shaft and an outside shaft,
- at least one single cam fixedly connected to the inside shaft by a pin passing radially through the outside shaft and passing radially through the outside shaft,
- a bearing of the pin in the respective pin receptacles, each running radially, in the cam and the inside shaft,
- wherein the axis of the pin receptacles runs obliquely inside the single cam with a blind hole bore in the base circle area of the cam and an outlet through a discharge groove in the axial side area of the cam elevation of the cam, and wherein
- the pin (5) and at least one of the pin receptacles (6) of the inside shaft (3) are of the single cam (1) are equipped with guidance means (15) aligned opposite and complementary to one another for a defined rotational angle position of the pin (5) with respect to its axis,
- the end of the pin (5) that comes to lie in the base circle area of the single cam (1) has an end face to be inserted into the base circle area of the single cam (1) in a surface-locking manner.

* * * * *